United States Patent Office 3,536,695
Patented Oct. 27, 1970

3,536,695
PHENYL-AZO-PHENYL DYES OF LOW
SOLUBILITY IN WATER
Wolfgang Groebke, Oberwil, Basel, Curt Mueller, Basel, and Roswitha Wirz, Liestal, Basel, Switzerland, assignors to Sandoz Ltd. (also known as Sandoz A.G.), Basel, Switzerland
No Drawing. Filed Dec. 8, 1966, Ser. No. 600,045
Claims priority, application Switzerland, Dec. 16, 1965, 17,397/65
Int. Cl. C07c 107/06; C09b 29/06
U.S. Cl. 260—207.1
4 Claims

ABSTRACT OF THE DISCLOSURE

Monoazo dyes of the 4-nitro-4'-amino-1,1'-azobenzene series having a cyanethylaminocarbonyl or cyanethylamino-sulfonyl group as a substituent in 2-position of the diazo component are highly suitable as disperse dyestuffs for dyeing or printing fibers or fiber materials made of synthetic or semi-synthetic, hydrophobic, high molecular organic substances.

This invention relates to azo dyes of low solubility in water, which have the formula

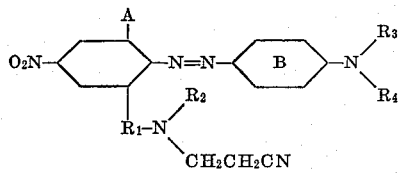

(I)

where

A represents a hydrogen, chlorine or bromine atom,
$R_1$ represents a carbonyl or sulphonyl group,
$R_2$ represents a hydrogen atom, an alkyl radical having 1 or 2 carbon atoms or the $\beta$-cyanethyl group,
$R_3$ and $R_4$, independently of each other, represent a hydrogen atom or an alkyl radical which bears 1 to 4 carbon atoms and may be substituted by a chlorine or bromine atom, a cyano, methoxy or ethoxy or an aliphatic acyl group having in all not more than 4 carbon atoms, and in which the ring B may bear further, non-water-solubilising substituents, e.g. alkyl or alkoxy groups having 1 or 2 carbon atoms.

The process of production of these dyes consists in diazotising an amine of formula

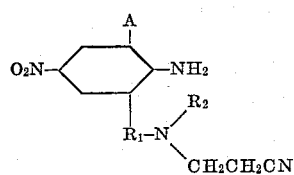

(II)

and coupling the diazo compound with a coupling component of formula

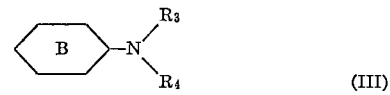

(III)

The term "water-solubilising groups" refers here to free carboxylic acid and sulphonic acid groups; accordingly the ring B may be substituted by halogen atoms, in particular chlorine and bromine atoms, alkyl and alkoxy groups having preferably 1 to 4 carbon atoms which may again be substituted, and other substituted or unsubstituted amino groups, for example an acylamino group.

The preferred dyestuffs of Formula I correspond to the formula

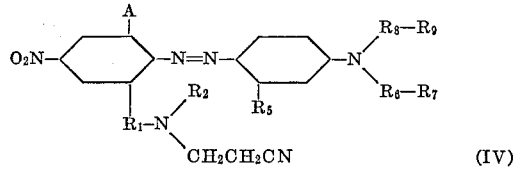

(IV)

where

A, $R_1$ and $R_2$ have the aforestated meanings and
$R_5$ stands for a hydrogen atom or an alkyl or alkoxy group having 1 or 2 carbon atoms,
$R_6$ and $R_8$, independently of each other, for alkylene radicals having 1 to 4 carbon atoms,
$R_7$ for a hydrogen atom or an alkylcarbonyl, alkoxycarbonyl, alkylcarbonyloxy or alkoxycarbonyloxy group having up to 4 carbon atoms, and
$R_9$ for a chlorine or bromine atom, a cyano group, or an alkoxy, alkylcarbonyl, alkoxycarbonyl, alklcarbonyloxy or alkoxycarbonyloxy group having up to 4 carbon atoms.

The components of Formula II are prepared by reacting a suitable cyanoethylamine with a phenylcarboxylic acid chloride or phenylsulphonic acid chloride by the generally known method.

Examples of suitable diazotizable amines of Formula II are 1-amino-2-N,N-bis-(2'-cyanethyl)-carboxylic acid amide-4-nitrobenzene,
1-amino-2-N-(2'-cyanethyl)-carboxylic acid amide-4-nitrobenzene,
1-amino-2-N,N-bis-(2'-cyanethyl)-sulphonic acid amide-4-nitrobenzene,
1-amino-2-N-(2'-cyanethyl)-sulphonic acid amide-4-nitrobenzene,
1-amino-2-N,N-bis-(2'-cyanethyl)-carboxylic acid amide-4,6-dinitrobenzene,
1-amino-2-N,N-bis-(2'-cyanethyl)-sulphonic acid amide-4-,6-dinitrobenzene,
1-amino-2-N,N-bis-(2'-cyanethyl)-carboxylic acid amide-4-nitro-6-bromobenzene,
1-amino-2-N,N-bis-(2'-cyanethyl)-sulphonic acid amide-4-nitro-6-bromobenzene, 1-amino-2-N,N-bis-(2'-cyanethyl)-carboxylic acid amide-4-nitro-6-chlorobenzene,
1-amino - 2 - N-(2'-cyanethyl)-carboxylic acid amide-4-nitro-6-bromobenzene,
1-amino-2-N-(2'-cyanethyl)-sulphonic acid amide-4-nitro-6-bromobenzene,
1-amino-2-N-(2'-cyanethyl) - N - methyl-sulphonic acid amide-4-nitrobenzene,
1-amino-2-N-(2'-cyanethyl)-N - ethyl - carboxylic acid amide-4-nitrobenzene,
1-amino-2-N-(2' - cyanethyl)-N - methyl-carboxylic acid amide-4-nitro-6-bromobenzene,
1-amino-2-N-(2'-cyanethyl)-N - ethyl - sulphonic acid amide-4-nitro-6-bromobenzene.

The following may be enumerated as examples of suitable coupling components:

N,N-bis-(2'-acetoxyethyl)-aminobenzene,
3-methyl-N,N-bis-(2'-acetoxyethyl)-aminobenzene,
3-methoxy-N,N-bis-(2'-acetoxyethyl)-aminobenzene,
N-ethyl-N-2'-acetoxyethyl-aminobenzene,
3-methyl-N-ethyl-N-2'-acetoxyethyl-aminobenzene,
N-ethyl-N-2'-methylcarbonylethyl-aminobenzene,
3-methyl-N-ethyl-N-2'-methylcarbonylethyl - aminobenzene,
N-2'-acetoxyethyl-N-2' - methylcarbonylethyl - aminobenzene,
3-methyl-N-2'-acetoxyethyl-N - 2' - methylcarbonylethyl-aminobenzene,
N,N-bis-(2'-ethoxycarbonyloxyethyl)-aminobenzene,
3-methyl-N,N-bis-(2' - ethoxycarbonyloxyethyl) - aminobenzene,
N-ethyl-N-2'-ethoxycarbonylethyl-aminobenzene,
3-ethyl-N-2'-ethoxycarbonylethyl-N-ethyl-aminobenzene.

The coupling reaction is generally carried out in an acid, if necessary buffered medium, with cooling, for example at temperatures of 0° to 5° C.

It is advantageous to convert the new dyes thus obtained (most of which are of red hue) into dyeing preparations before use. For this purpose they are comminuted until the average particle size is about 0.01 to 10 microns or more particularly 0.1 to 5 microns. Comminution can be carried out in the presence of dispersants or fillers. For example, the dried dye can be ground with a dispersant and if desired fillers, or it can be kneaded in paste form with a dispersant and then vacuum or jet dried. After the addition of a suitable volume of water the resulting dyeing preparations can be dyed, padded or printed at a long or short liquor ratio. For dyeing at long liquor ratios up to about 10 grams of dye per litre are generally used, for padding up to about 150 grams per litre or preferably 0.1 to 100 grams per litre, and for printing up to about 150 grams per 1000 grams of printing paste. The liquor ratio may vary in wide limits, for example from 1:3 to 1:200 or preferably from 1:3 to 1:80.

From aqueous dispersion the dyes build up on materials of fully synthetic and semi-synthetic organic high molecular substances. They are specially suitable for dyeing, padding and printing filaments, loose fibres, yarn, woven fabrics and knit goods of linear aromatic polyesters, secondary cellulose acetate and cellulose triacetate.

Synthetic polyamides, polyolefins, acrylonitrile polymerisation products and polyvinyl compounds can also be dyed with the dyes of the present invention. Very valuable dyeings are obtained on linear aromatic polyesters, which are generally the polycondensation products of terephthalic acid and glycols, notably ethylene glycol.

The known dyeing methods are used. Polyester fibres can be exhaustion dyed at normal or excess pressure in the presence of carriers at temperatures of about 80° to about 125° C., or in the absence of carriers at about 100° to 140° C. They can be padded or printed with aqueous dispersions of the new dyes and the paddings or prints fixed at about 140° to 230° C., for example by means of water vapour or air. In the optimum temperature range of 180° to 220° C. the dyes diffuse rapidly into polyester fibre and do not then sublime, even when exposed to these high temperatures for some length of time. This precludes inconvenient contamination of the dyeing equipment. Secondary cellulose acetate is dyed preferably at temperatures of about 65° to 80° C. and cellulose tri-acetate at temperatures up to about 115° C. The optimum pH range is 2 to 9 or more particularly 4 to 8.

In general, the commonly used dispersants or mixtures of dispersants, preferably those of anionic or non-ionic character, are employed. About 0.5 gram of dispersant per litre of the dyeing medium are often sufficient, although larger amounts, for example up to about 3 grams per litre, can be used. Amounts in excess of 5 grams do not generally offer any further advantage. Known anionic dispersants which are suitable for the process are, for instance, the condensation products of naphthalenesulphonic acids and formaldehyde, in particular dinaphthylmethane disulphonates, the esters of sulphonated succinic acid, Turkey red oil, the alkaline salts of the sulphuric acid esters of fatty alcohols, for example sodium lauryl sulphate and sodium cetyl sulphate, sodium lignin sulphonate and its alkaline salts, soaps, and the alkaline sulphates of the monoglycerides of fatty acids. Examples of known and highly suitable non-ionic dispersants are the adducts of about 3–40 moles of ethylene oxide on alkylphenols, fatty alcohols or fatty amines and their neutral sulphuric acid esters.

In padding and printing applications the normal thickening agents are used, for example modified or unmodified natural products, such as alginates, British gum, gum arabic, crystal gum, locust bean gum, gum tragacanth, starches, carboxymethyl cellulose and hydroxyethyl cellulose, or synthetic products, such as polyacrylamides and polyvinyl alcohols.

The dyeings obtained are extremely fast, for instance to washing, gas fumes, thermofixation, sublimation and pleating.

The dyes obtained in accordance with this invention are superior in the thermofixation fastness to the dyes disclosed in Swiss Pat. No. 389,312. This excellent thermofixation behavior is important in connection with the process [described in the American Dyestuffs Reporter, 54, page 738, (1965)] for the shape and dimensional stabilisation of textile materials and garments made of blended polyester and cotton fibres. In this process dyed material is treated with a liquor containing a selected synthetic resin, a catalyst and softeners, dried at 80–110° C. to a moisture content of 6–8% and used in this state for the manufacture of garments or other textile goods. The final manufactured article is treated for 10–30 or preferably 15–18 minutes at 140–230° C. or preferably 170–180° C., to set its shape and size.

The parts and percentages named in the examples are by weight and the temperatures are given in degrees centigrade.

EXAMPLE 1

7 parts of sodium nitrite are added to 155 parts of sulphuric acid at maximum 70° and subsequently 100 parts of glacial acetic acid and 27 parts of 1-amino-2-(2'-cyanethyl)-sulphonamide-4-nitrobenzene are added at 20°. After 1 hour the diazonium salt solution is combined with a solution of 26.5 parts of N,N-bis-(acetoxyethyl)-aminobenzene in 30 parts of glacial acetic acid, 5 parts of aminosulphonic acid and 100 parts of ice-water. The coupling reaction is completed by adding sufficient sodium acetate to obtain pH 4. The dye formed is suctioned off, washed free of acid and dried. After re-crystallisation from alcohol its melting point is 120°. It dyes polyester fibres in ruby shades with good fastness properties.

The dyes listed in the following table can be produced in accordance with the particulars of Example 1; these dyes correspond to the general formula

TABLE

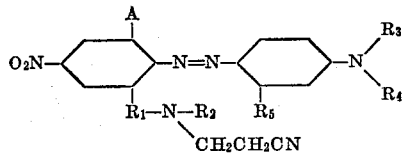

| Example No. | A | $R_1$ | $R_2$ | $R_3$ | $R_4$ | $R_5$ |
|---|---|---|---|---|---|---|
| 2 | —H | —SO₂— | —H | —CH₂CH₂—OCOCH₃ | —CH₂CH₂OCOCH₃ | —CH₃ |
| 3 | —H | —SO₂— | —CH₂CH₂CN | —CH₂CH₂—OCOCH₃ | —CH₂CH₂OCOCH₃ | —H |
| 4 | —H | —CO— | —H | —CH₂CH₂—OCOCH₃ | —CH₂CH₂OCOCH₃ | —CH₃ |
| 5 | —NO₂ | —CO— | —CH₂CH₂CN | —CH₂CH₂—OCOCH₃ | —CH₂CH₂OCOCH₃ | —CH₃ |
| 6 | —NO₂ | —CO— | —CH₂CH₂CN | —CH₂CH₂—OCOCH₃ | —CH₂CH₂OCOCH₃ | —H |
| 7 | —Br | —SO₂— | —H | —CH₂CH₂—OCOCH₃ | —CH₂CH₂OCOCH₃ | —H |
| 8 | —Br | —CO— | —H | —CH₂CH₂—OCOCH₃ | —CH₂CH₂OCOCH₃ | —H |
| 9 | —NO₂ | —SO₂— | —CH₂CH₂CN | —CH₂CH₂—OCOCH₃ | —CH₂CH₂OCOCH₃ | —H |
| 10 | —NO₂ | —SO₂— | —CH₂CH₂CN | —CH₂CH₂—OCOCH₃ | —CH₂CH₂OCOCH₃ | —CH₃ |
| 11 | —Cl | —SO₂— | —CH₂CH₂CN | —CH₂CH₂—OCOCH₃ | —CH₂CH₂OCOCH₃ | —C₂H₅ |
| 12 | —Br | —SO₂— | —CH₂CH₂CN | —CH₂CH₂—OCOCH₃ | —CH₂CH₂OCOCH₃ | —OCH₃ |
| 13 | —Br | —CO— | —CH₂CH₂CN | —CH₂CH₂—OCOCH₃ | —CH₂CH₂OCOCH₃ | —OC₂H₅ |
| 14 | —Br | —CO— | —CH₂CH₂CN | —CH₂CH₂—OCOCH₃ | —CH₂CH₂OCOCH₃ | —CH₃ |
| 15 | —H | —SO₂— | —CH₃ | —CH₂CH₂—OCOCH₃ | —CH₂CH₂OCOCH₃ | —H |
| 16 | —H | —SO₂— | —CH₃ | —C₂H₅ | —CH₂CH₂OCOCH₃ | —CH₃ |
| 17 | —H | —SO₂— | —CH₃ | —CH₂CH₂OCOCH₃ | —CH₂CH₂OCOCH₃ | —H |
| 18 | —H | —CO— | —CH₃ | —CH₂CH₂OCOCH₃ | —CH₂CH₂OCOCH₃ | —CH₃ |
| 19 | —H | —CO— | —CH₃ | —CH₂CH₂OCOCH₃ | —CH₂CH₂OCOCH₃ | —H |
| 20 | —H | —CO— | —CH₃ | —C₂H₅ | —CH₂CH₂OCOCH₃ | —H |
| 21 | —NO₂ | —CO— | —C₂H₅ | —CH₂CH₂OCOCH₃ | —CH₂CH₂OCOCH₃ | —CH₃ |
| 22 | —NO₂ | —CO— | —C₂H₅ | —CH₂CH₂OCOCH₃ | —CH₂CH₂OCOCH₃ | —CH₃ |
| 23 | —Br | —SO₂— | —CH₃ | —CH₂CH₂OCOCH₃ | —CH₂CH₂OCOCH₃ | —CH₃ |
| 24 | —Br | —SO₂— | —CH₃ | —C₂H₅ | —CH₂CH₂OCOCH₃ | —CH₃ |
| 25 | —Br | —CO— | —CH₃ | —CH₂CH₂OCOCH₃ | —CH₂CH₂OCOCH₃ | —H |
| 26 | —Br | —CO— | —CH₃ | —C₂H₅ | —CH₂CH₂OCOCH₃ | —CH₃ |
| 27 | —Br | —CO— | —C₂H₅ | CH₂CH₂OCOCH₃ | —CH₂CH₂OCOCH₃ | —OCH₃ |
| 28 | —H | —SO₂— | —H | —C₂H₅ | —CH₂CH₂COCH₃ | —H |
| 29 | —H | —SO₂— | —H | —C₂H₅ | —CH₂CH₂COCH₃ | —CH₃ |
| 30 | —H | —SO₂— | —H | —CH₂CH₂OCOCH₃ | —CH₂CH₂COCH₃ | —H |
| 31 | —H | —SO₂— | —H | —CH₂CH₂OCOCH₃ | —CH₂CH₂COCH₃ | —CH₃ |
| 32 | —H | —CO— | —H | —C₂H₅ | —CH₂CH₂COCH₃ | —H |
| 33 | —H | —CO— | —H | —CH₂CH₂OCOCH₃ | —CH₂CH₂COCH₃ | —H |
| 34 | —H | —SO₂— | —H | —C₂H₅ | —CH₂CH₂COOC₂H₅ | —H |
| 35 | —H | —SO₂— | —H | —C₂H₅ | —CH₂CH₂COOC₂H₅ | —CH₃ |
| 36 | —H | —CO— | —H | —C₂H₅ | —CH₂CH₂COOC₂H₅ | —CH₃ |
| 37 | —H | —CO— | —H | —C₂H₅ | —CH₂CH₂COOC₂H₅ | —H |
| 38 | —H | —SO₂— | —H | —CH₂CH₂Cl | —C₂H₅ | —H |
| 39 | —H | —SO₂— | —CH₃ | —CH₂CH₂Cl | —C₂H₅ | —H |
| 40 | —H | —SO₂— | —H | —C₂H₅ | —CH₂CH₂CH₃ | —H |
| 41 | —H | —SO₂— | —H | —C₂H₅ | —CH₂CH₂CH₂CH₃ | —H |
| 42 | —H | —SO₂— | —CH₃ | —C₂H₅ | —CH₂CH₂OCH₃ | —H |
| 43 | —H | —SO₂— | —H | —CH₂CH₂OCOOCH₃ | —CH₂CH₂OCOOCH₃ | —H |
| 44 | —H | —SO₂— | —H | —C₂H₅ | —CH₂CH₂OCOCH₃ | —H |
| 45 | —H | —SO₂— | —H | —CH₂CH₂CN | —CH₂CH₂OCOCH₃ | —H |
| 46 | —H | —SO₂— | —H | —CH₂CH₂COOC₂H₅ | —CH₂CH₂COOC₂H₅ | —H |
| 47 | —H | —SO₂— | —H | —C₂H₅ | —CH₂CH₂OCOCH₃ | —CH₃ |
| 48 | —H | —SO₂— | —H | —C₂H₅ | —CH₂CH₂OCOOC₂H₅ | —H |
| 49 | —H | —SO₂— | —H | —C₂H₅ | —CH₂CH₂OCOOC₂H₅ | —CH₃ |
| 50 | —H | —SO₂— | —H | —CH₂CH₂CN | —CH₂CH₂OCOOC₂H₅ | —H |
| 51 | —H | —SO₂— | —H | —CH₂CH₂OCOCH₃ | —CH₂CH₂COCH₃ | —H |

DYEING EXAMPLE

A mixture of 7 parts of the dye obtained in accordance with Example 1, 4 parts of sodium dinaphthylmethane disulphonate, 4 parts of sodium cetyl sulphate and 5 parts of anhydrous sodium sulphate is ground in a ball mill for 48 hours to form a fine powder. One part of this dyeing preparation is dispersed in 3000 parts of water containing 3 parts of a 30% solution of a highly sulphonated castor oil and 20 parts of an emulsion of chlorinated benzene. At 20–25° 100 parts of a fabric of "Dacron" (registered trade mark) polyester fibre are entered into this bath, the temperature of the bath is increased to 90–100° in about 30 minutes and the fabric dyed for 1 hour at this temperature. It is then removed, rinsed, soaped for 15 minutes at 70° with a 0.1% solution of an alkylphenolpolyglycolether, rinsed again and dried. A dyeing of ruby shade with excellent fastness properties is obtained.

Formulae of representative dyes of the foregoing examples are as follows:

Example 1

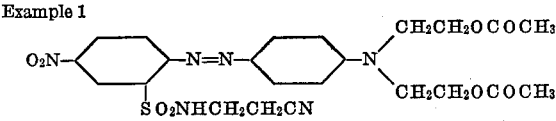

Example 2

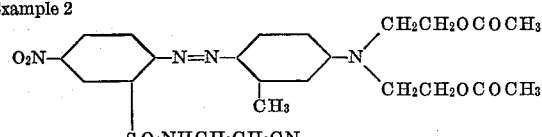

Example 43

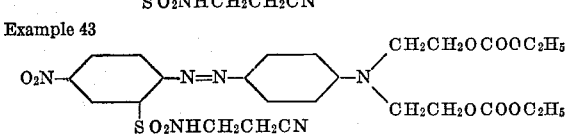

Example 44

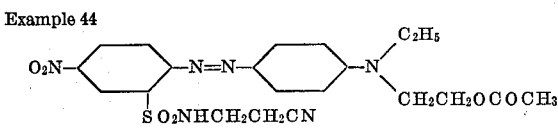

Example 45

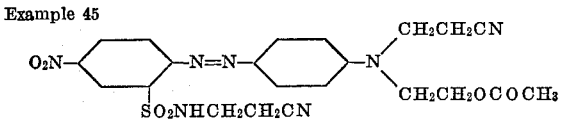

Example 46

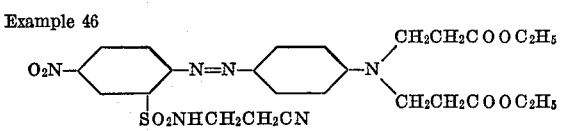

Example 47: $O_2N-C_6H_3(SO_2NHCH_2CH_2CN)-N=N-C_6H_3(CH_3)-N(C_2H_5)(CH_2CH_2OCOCH_3)$ Example 48: $O_2N-C_6H_4-N=N-C_6H_3(SO_2CH_2CH_2CN)-N(C_2H_5)(CH_2CH_2OCOOC_2H_5)$ Example 49: $O_2N-C_6H_3(SO_2NHCH_2CH_2CN)-N=N-C_6H_3(CH_3)-N(C_2H_5)(CH_2CH_2OCOOC_2H_5)$ Example 50: $O_2N-C_6H_3(SO_2NHCH_2CH_2CN)-N=N-C_6H_4-N(CH_2CH_2CN)(CH_2CH_2OCOOC_2H_5)$ Example 40: $O_2N-C_6H_3(SO_2NHCH_2CH_2CN)-N=N-C_6H_4-N(C_2H_5)(CH_2CH_2OCH_3)$ Example 28: $O_2N-C_6H_3(SO_2NHCH_2CH_2CN)-N=N-C_6H_4-N(C_2H_5)(CH_2CH_2COCH_3)$ Example 51: $O_2N-C_6H_3(SO_2NHCH_2CH_2CN)-N=N-C_6H_4-N(CH_2CH_2OCOCH_3)(CH_2CH_2COCH_3)$ Example 29: $O_2N-C_6H_3(SO_2NHCH_2CH_2CN)-N=N-C_6H_3(CH_3)-N(C_2H_5)(CH_2CH_2COCH_3)$ Example 31: $O_2N-C_6H_3(SO_2NHCH_2CH_2CN)-N=N-C_6H_3(CH_3)-N(CH_2CH_2OCOCH_3)(CH_2CH_2COCH_3)$ Example 34: $O_2N-C_6H_3(SO_2NHCH_2CH_2CN)-N=N-C_6H_4-N(C_2H_5)(CH_2CH_2COOC_2H_5)$ Example 35: $O_2N-C_6H_3(SO_2NHCH_2CH_2CN)-N=N-C_6H_3(CH_3)-N(C_2H_5)(CH_2CH_2COOC_2H_5)$ Having thus disclosed the invention what we claim is:

1. Monoazo phenyl-azo-phenyl dye of low water-solubility of the formula

[Structural formula with substituents A, $R_1$, $R_2$, $R_3$, $R_4$, $R_5$, and $CH_2CH_2CN$]

wherein $R_1$ is a member selected from the group consisting of carbonyl and sulfonyl;

$R_2$ is a member selected from the group consisting of hydrogen atom, alkyl having from 1 to 2 carbon atoms, inclusive, and β-cyanethyl;

each of $R_3$ and $R_4$ is, independently, either (a) a hydrogen atom, (b) alkyl, (c) substituted alkyl, any substituent of which is a member selected from the group consisting of chloro, bromo, cyano, methoxy and ethoxy, or (d) aliphatic acyl alkyl, each aliphatic acyl of which is a member selected from the group consisting of alkylcarbonyloxy, alkoxycarbonyloxy, alkoxycarbonyl and alkylcarbonyl; each alkyl, each alkoxy and each aliphatic acyl in the definition of $R_3$ and $R_4$ having at most 4 carbon atoms;

$R_5$ is a member selected from the group consisting of a hydrogen atom, alkyl having 1 or 2 carbon atoms and alkoxy having 1 or 2 carbon atoms; and A is a member selected from the group consisting of a hydrogen atom chloro and bromo.

2. A dye according to claim 1 of the formula

[Structural formula with A, $R_1$, $R_2$, $R_5$, $R_6-R_7$, $R_8-R_9$, and $CH_2CH_2CN$] (IV)

wherein

A is a hydrogen, chlorine or bromine atom, $R_1$ is a carbonyl or sulphonyl group, $R_2$ is a hydrogen atom, an alkyl radical having 1 or 2 carbon atoms or the β-cyanethyl group, $R_5$ is a hydrogen atom or an alkyl or alkoxy group having 1 or 2 carbon atoms, each of $R_6$ and $R_8$, is independently, a alkylene radical having 1 to 4 carbon atoms, $R_7$ is a hydrogen atom or an alkylcarbonyl, alkoxycarbonyl, alkylcarbonyloxy or alkoxycarbonyloxy group having up to 4 carbon atoms, and $R_9$ is a chlorine or bromine atom, a cyano group, or an alkoxy, alkylcarbonyl, alkoxycarbonyl, alkylcarbonyloxy or alkoxycarbonyloxy group having up to 4 carbon atoms.

3. A dye according to claim 2 wherein each of $R_6$ and $R_8$ has up to 2 carbon atoms.

4. The dye according to claim 2 of the formula $O_2N-C_6H_3(SO_2NHCH_2CH_2CN)-N=N-C_6H_4-N(CH_2CH_2OCOCH_3)_2$

References Cited

UNITED STATES PATENTS 2,261,175  11/1941  McNally et al. ___ 260—207.1 X
2,967,858  1/1961   Merian et al. ___ 260—207.1 X CHARLES B. PARKER, Primary Examiner C. F. WARREN, Assistant Examiner U.S. Cl. X.R.

260—205, 206, 207.1, 207.5; 8—4, 41, 50